United States Patent Office 3,786,105
Patented Jan. 15, 1974

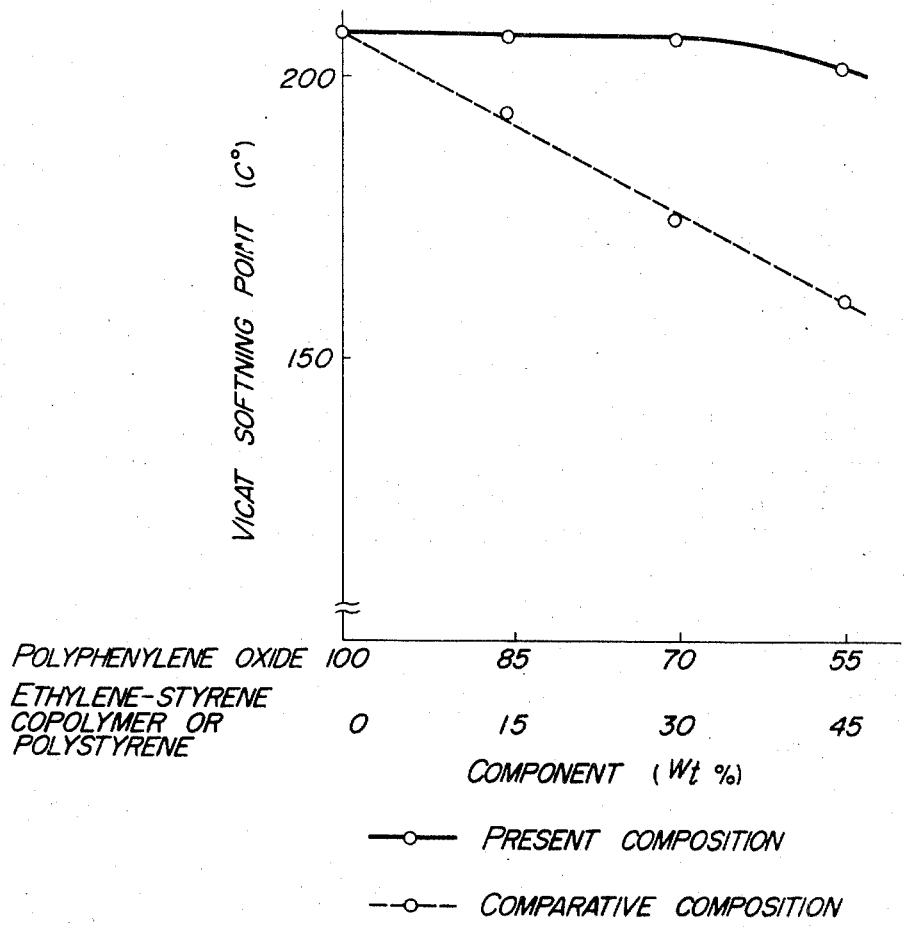

3,786,105
POLYPHENYLENE OXIDE AND ETHYLENE/ STYRENE COPOLYMER BLEND COMPOSITION
Seizo Nakashio, Nishinomiya, Kanji Yoshikawa, Niihama, Toshio Takemura, Kyoto, and Kunio Ota, Takatsuki, Japan, assignors to Sumitomo Chemical Company, Limited, Osaka, Japan
Filed Apr. 24, 1972, Ser. No. 246,764
Claims priority, application Japan, Apr. 27, 1971, 46/28,367
Int. Cl. C08f 41/12
U.S. Cl. 260—897 R                4 Claims

ABSTRACT OF THE DISCLOSURE

A composition comprising a mixture of 99 to 40% by weight of a polyphenylene oxide and 1 to 60% by weight of an ethylene-styrene copolymer. The composition displays excellent processability and impact resistance, while retaining a high softening point and a high heat distortion temperature which are inherent to the polyphenylene oxide, and does not cause phase separation.

---

This invention relates to a polyphenylene oxide composition having an improved impact resistance and processability. More particularly, the invention pertains to a composition comprising a polyphenylene oxide and an ethylene-styrene copolymer.

Polyphenylene oxide is known as a resin excellent in heat resistance, chemical resistance, and mechanical and electrical properties. However, said polymer is not so satisfactory in impact resistance as compared with other resins such as polycarbonates and polyamides which are used as industrial materials. Further, said polymer is inferior in processability due to their being inherently high in softening point and heat distortion temperature, and hence has been desired to be improved in processability.

In order to solve the above-mentioned problems, there has been proposed a process in which polyphenylene oxides are blended with styrene polymers (Japanese patent publication No. 17,812/68) or with polyethylene or polypropylene (Japanese patent publication No. 7,069/67). However, compositions obtained according to the abovementioned processes are not satisfactory in properties. For example, in the case of the compositions comprising polyphenylene oxides and styrene polymers which are described as embodiments in Japanese patent publication No. 17,812/68, the softening points of the compositions linearly vary according to the proportions of the constituents. That is, there is observed such a phenomenon that the softening points of the compositions are quickly decreased with an increase in proportions of the styrene polymers. On the other hand, compositions obtained according to the process disclosed in Japanese patent publication No. 7,069/67 are not satisfactory in impact resistance even when polyphenylene oxides are blended with considerably large amounts of polyethylene or polypropylene, as seen in the working examples. Moreover, in view of their solubility parameters, polyethylene and polypropylene are considered to be not well compatible with polyphenylene oxides. This has been recognized in practice. Such compositions necessarily bring about a phenomenon of phase separation.

As the result of extensive studies, the present inventors have found that a composition, which has been improved in processability and impact resistance without deterioration of softening point and heat distortion temperature (important properties for an engineering resin required to be high in heat resistance), and which does not cause phase separation, can be obtained by mixing a polyphenylene oxide with an ethylene-styrene copolymer.

It is well known that in general, plastics bring about elastic deformation, but cannot bring about such plastic deformation as in the case of metal. However, the composition of the present invention can bring about plastic deformation. In this sense, it is expected that the composition of the present invention will find many promising uses in practice.

An object of the present invention is to provide a composition comprising a mixture of 99 to 40% by weight of a polyphenylene oxide and 1 to 60% by weight of an ethylene-styrene copolymer.

Other objects and advantages of the invention will become apparent from the description made below.

The polyphenylene oxide used in the present composition has a structure represented by the general formula,

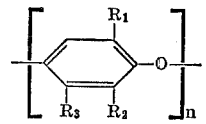

In the abovementioned formula, at least one of $R_1$ and $R_2$ is a halogen atom, a hydrocarbon group, a halogen- or cyano-substituted hydrocarbon group, a hydrocarbonoxy group or a halogen-substituted hydrocarbonoxy group, and the other is a hydrogen atom. Further, $R_3$ is any of the substituents represented by $R_1$ and $R_2$, and $n$ is a polymerization degree represented by an integer of 50 or more. Examples of $R_1$, $R_2$ and $R_3$ are hydrogen, chlorine, bromine, iodine, methyl, ethyl, propyl, allyl, phenyl, tolyl, benzyl, methylbenzyl, chloromethyl, bromomethyl, cyanoethyl, methoxy, ethoxy, phenoxy, chloromethoxy and the like.

Examples of the polyphenylene oxides used in the present composition include poly-2,6-dimethyl-1,4-phenylene oxide,
poly-2,6-diethyl-1,4-phenylene oxide,
poly-2,6-dipropyl-1,4-phenylene oxide,
poly-2-methyl-6-isopropyl-1,4-phenylene oxide,
poly-2,6-dimethoxy-1,4-phenylene oxide,
poly-2,6-dichloromethyl-1,4-phenylene oxide,
poly-2,6-dibromomethyl-1,4-phenylene oxide,
poly-2,6-diphenyl-1,4-phenylene oxide,
poly-2,6-ditolyl-1,4-phenylene oxide,
poly-2,6-dichloro-1,4-phenylene oxide,
poly-2,5-dimethyl-1,4-phenylene oxide and the like. Among these, preferable polyphenylene oxide is poly-2,6-dimethyl-1,4-phenylene oxide. The polyphenylene oxide used in the present composition can be prepared according to any of the known methods disclosed in, for example, Japanese patent publication Nos. 18,692/61, 14,645/62, 10,092/62, 29,373/64, 16,423/65, 22,269/65, 27,068/67, 3,195/67, Dutch patent application Nos. 67–12,144, 68–01,524, 68–04,186, 67–06,964, 68–12,423, 66–16,789, 64–03,375, U.S. Pat. Nos. 3,342,-892, 3,442,855, 3,134,753 and French Pat. No. 7045242, etc. The amount of the polyphenylene oxide used in the present composition is 99 to 40% by weight, preferably 97 to 70% by weight.

The ethylene-styrene copolymer used in the present composition is a copolymer composed of 25 to 95% by weight of ethylene and 75 to 5% by weight of styrene, preferably 40 to 90% by weight of ethylene and 60 to 10% by weight of styrene. The said copolymer can be prepared according to any of the known methods disclosed in, for example, Japanese patent publication No. 20,190/65, British Pat. Nos. 497,643 and 578,584, and U.S. Pat. Nos. 2,334,195, 2,467,234 and 2,342,400, etc. The ethylenestyrene copolymer varies in form depending on the content of styrene and the kind of catalyst used, and is in a rubbery to resinous form. The amount of the ethylenestyrene copolymer used in the present composition varies depending on the proportions of ethylene and styrene in the copolymer, but is 1 to 60% by weight, preferably 3 to 30% by weight, and the proportion of ethylene in the copolymer is 0.3 to 25% by weight, preferably 0.5 to 20% by weight based on the total weight of the composition. If the amount of the ethylene-styrene copolymer is more than 60% by weight, the excellent physical properties inherent to polyphenylene oxide cannot sufficiently be displayed.

The mixing of the polyphenylene oxide with the ethylene-styrene copolymer may be carried out according to any of the known procedures, e.g. a mechanical mixing procedure using a roll mill or Bunbury mixer, or a mixing procedure conducted in a solution or suspension state.

The present invention is illustrated in detail below with reference to examples, but the examples are illustrative and not limitative, and various modifications are possible within the scope of the invention.

EXAMPLE 1

A 5 wt. percent xylene solution of an ethylene-styrene copolymer having an intrinsic viscosity of 0.68 dl./g. as measured in Tetralin at 135° C. and containing 57.7% by weight of ethylene and 42.3% by weight of styrene was mixed with a 5 wt. percent xylene solution of poly-2,6-dimethyl-1,4-phenylene oxide having an intrinsic viscosity of 0.53 dl./g. as measured in chloroform at 25° C. Thereafter, the solution was poured into methanol to precipitate a polymer composition comprising the polyphenylene oxide and the ethylene-styrene copolymer, and the polymer composition was filtered and dried.

For comparison, a control composition was prepared by repeating the above-mentioned procedure except using polystyrene having an intrinsic viscosity of 0.76 dl./g. as measured in toluene at 30° C. instead of the ethylene-styrene copolymer.

The thus prepared compositions were individually measured in impact strength and softening point. The impact strength of each composition was as shown in Table 1, and the softening point of each composition was as shown in FIG. 1.

TABLE 1

| Present composition ||| Control composition |||
|---|---|---|---|---|---|
| Ethylene-styrene copolymer (wt. percent) | Polyphen- ylene oxide (wt. percent) | Charpy impact value (kg.-cm./cm.²) | Poly- styrene (wt. percent) | Polypuen- ylene oxide (wt. percent) | Charpy impact value (kg.-cm./cm.²) |
| 0 | 100 | 4.5 | 0 | 100 | 4.5 |
| 5 | 95 | 9.1 | 5 | 95 | 4.0 |
| 10 | 90 | 18.3 | 10 | 90 | 3.7 |
| 15 | 85 | 26.0 | 15 | 85 | 3.1 |

The impact strength is a Charpy impact value (with notch, at 20° C.) measured according to JIS K-6745, and the softening point is a Vicat softening point measured according to ASTM D-1525.

EXAMPLE 2

The same ethylene-styrene copolymer and polyphenylene oxide as used in Example 1 were blended with each other in the same manner as in Example 1 to prepare a composition comprising said compounds in such proportions as shown in Table 2.

For comparison, the same polystyrene and polyphenylene oxide as used in Example 1 were blended with each other in the same manner as in Example 1 were blended with each other in the same manner as in Example 1 to prepare a composition comprising said compounds in such proportions as shown in Table 2.

The thus prepared compositions were individually measured in heat distortion temperature and melt flow rate. The heat distortion temperature was measured according to ASTM D-648. The melt flow rate was measured according to ASTM D-1238 under a load of 18.6 kg./cm.², and in case the content of the ethylene-styrene copolymer or polystyrene was 15% by weight, the measurement was effected at 280° C. under a load of 10 kg./cm.², while in case the content of the ethylene-styrene copolymer or polystyrene was 40% by weight, the measurement was effected at 250° C. under a load of 10 kg.

The results obtained are as shown in Table 2.

TABLE 2

| Present composition |||| Control composition ||||
|---|---|---|---|---|---|---|---|
| Ethylene-styrene copolymer (wt. percent) | Polyphen- ylene oxide (wt. percent) | Heat distortion temperature (° C.) | Melt flow rate (g./10 min.) | Polystyrene (wt. percent) | Polyphen- ylene oxide (wt. percent) | Heat distortion temperature (° C.) | Melt flow rate (g./10 min.) |
| 0 | 100 | 185 | 1.3 | 0 | 100 | 185 | 1.3 |
| 15 | 85 | 183 | 2.8 | 15 | 85 | 163 | 2.7 |
| 40 | 60 | 172 | 2.5 | 40 | 60 | 120 | 2.4 |

EXAMPLE 3

Using 900 parts by weight of toluene as a solvent, 6 parts by weight of an ethylene-styrene copolymer having parts by weight of an ethylene-styrene copolymer having an intrinsic viscosity of 0.84 dl./g. as measured in Tetralin at 135° C. and containing 74.0% by weight of ethylene and 26.0% by weight of styrene was blended with 94 parts by weight of poly-2,6-dimethyl-1,4-phenylene oxide having an intrinsic viscosity of 0.55 dl./g. as measured in chloroform at 25° C. and then, the mixture was poured into methanol to prepare a polymer composition comprising the polyphenylene oxide and the ethylene-styrene copolymer, and the polymer composition was filtered and dried. The thus prepared composition was measured in tensile strength, impact strength, softening point and melt flow rate, and compared in said properties with the polyphenylene oxide alone. The tensile strength was measured according to ASTM D-63. The impact strength and softening point were measured according to the methods as shown in Example 1, respectively, and the melt flow rate Example 2.

The results obtained are as shown in Table 3.

TABLE 3

|  | Present composition | Polyphen- ylene oxide alone |
|---|---|---|
| Tensile strength (kg./cm.²) | 170 | 705 |
| Charpy impact value (kg.-cm./cm.²) | 15.3 | 4.5 |
| Vicat softening point (° C.) | 208 | 208 |
| Melt flow rate (g./10 min.) | 2.0 | 1.3 |

What is claimed:

1. A polyphenylene oxide composition comprising a mixture of 99 to 40% by weight of a polyphenylene oxide represented by the general formula,

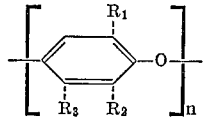

wherein at least one of $R_1$ and $R_2$ is a halogen atom, a hydrocarbon group, a halogen-substituted hydrocarbon group, a cyano-substituted hydrocarbon group, a hydrocarbonoxy group or a halogen-substituted hydrocarbonoxy group, and the other is a hydrogen atom; $R_3$ is any of the substituents represented by $R_1$ and $R_2$; and $n$ is a polymerization degree represented by an integer of 50 or more, and 1 to 60% by weight of an ethylene-styrene binary copolymer wherein the ethylene content of said copolymer is 25–95% by weight of the copolymer.

2. A composition according to claim 1, wherein the proportion of the polyphenylene oxide is 97 to 70% by weight, and the proportion of the ethylene-styrene copolymer is 3 to 30% by weight.

3. A composition according to claim 1, wherein the polyphenylene oxide is poly - 2,6-dimethyl-1,4-penylene oxide.

4. A composition according to claim 1, wherein the ethylene-styrene copolymer comprises 40 to 90% by weight of ethylene and 60 to 10% by weight of styrene.

References Cited
UNITED STATES PATENTS

| | | | |
|---|---|---|---|
| 3,658,945 | 4/1972 | Nakashio et al. | 260—876 R |
| 3,361,851 | 1/1968 | Gowan | 260—897 |
| 3,472,810 | 10/1969 | Gowan | 260—33.6 |
| 3,373,226 | 3/1968 | Gowan | 260—874 |

C. J. SECCURO, Primary Examiner

U.S. Cl. X.R.

260—874